US011232550B2

(12) United States Patent
Ben Baruch et al.

(10) Patent No.: US 11,232,550 B2
(45) Date of Patent: Jan. 25, 2022

(54) GENERATING A TRAINING SET USABLE FOR EXAMINATION OF A SEMICONDUCTOR SPECIMEN

(71) Applicant: Applied Materials Israel Ltd., Rehovot (IL)

(72) Inventors: Elad Ben Baruch, Kiryat Gat (IL); Shalom Elkayam, Ramla (IL); Shaul Cohen, Irus (IL); Tal Ben-Shlomo, Givatayim (IL)

(73) Assignee: Applied Materials Israel Ltd., Rehovot (IL)

( * ) Notice: Subject to any disclaimer, the term of this patent is extended or adjusted under 35 U.S.C. 154(b) by 4 days.

(21) Appl. No.: 16/916,047

(22) Filed: Jun. 29, 2020

(65) Prior Publication Data
US 2021/0407072 A1 Dec. 30, 2021

(51) Int. Cl.
*G06T 7/00* (2017.01)
*G06K 9/62* (2006.01)
*G06T 7/143* (2017.01)

(52) U.S. Cl.
CPC .......... *G06T 7/0004* (2013.01); *G06K 9/6256* (2013.01); *G06T 7/143* (2017.01); *G06T 2207/20081* (2013.01); *G06T 2207/20084* (2013.01); *G06T 2207/30148* (2013.01)

(58) Field of Classification Search
CPC .................. G06T 7/0004; G06T 7/143; G06T 2207/20081; G06T 2207/20084; G06T 2207/30148; G06K 9/6256
See application file for complete search history.

(56) References Cited

U.S. PATENT DOCUMENTS

| 10,776,662 | B2* | 9/2020 | Sigal ........................ G06N 3/08 |
| 10,832,092 | B2* | 11/2020 | Shaubi ..................... G06N 3/08 |
| 11,097,128 | B2* | 8/2021 | Sjolund ................ A61N 5/1039 |
| 2019/0347526 | A1* | 11/2019 | Sunkavalli .............. G06K 9/46 |
| 2020/0211229 | A1* | 7/2020 | Hwang .................... G06N 3/04 |
| 2021/0248747 | A1* | 8/2021 | Tang .................... A61N 5/1039 |

OTHER PUBLICATIONS

Yumiba, R., Ishikawa, M., Shinoda, S., Sakimura, S., Toyoda, Y., Shindo, H., & Izawa, M. (Mar. 2019). Deep learning's impact on contour extraction for design based metrology and design based inspection. In Metrology, Inspection, and Process Control for Microlithography XXXIII (vol. 10959, p. 1095912). International Society for Optics and Photonics.

\* cited by examiner

*Primary Examiner* — Bobbak Safaipour
(74) *Attorney, Agent, or Firm* — Lowenstein Sandler LLP

(57) ABSTRACT

There is provided a system and method of generating a training set for training a Deep Neural Network usable for examination of a specimen. The method includes: for each given training image in a group: i) generating a first batch of training patches, including cropping the given training image into a first plurality of original patches; and augmenting at least part of the first plurality of original patches in order to simulate variations caused by a physical process of the specimen; and ii) generating a second batch of training patches, including: shifting the plurality of first positions on the given training image to obtain a second plurality of original patches, and repeating the augmenting to the second plurality of original patches to generate a second plurality of augmented patches; and including at least the first second batches of training patches corresponding to each given training image in the training set.

20 Claims, 7 Drawing Sheets

GENERATING A TRAINING SET USABLE FOR EXAMINATION OF A SEMICONDUCTOR SPECIMEN

TECHNICAL FIELD

The presently disclosed subject matter relates, in general, to the field of examination of a specimen, and more specifically, to automating the examination of a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations, as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase, at least some of the suspected locations are more thoroughly analyzed with relatively high resolution. In some cases, both phases can be implemented by the same inspection tool, and, in some other cases, these two phases are implemented by different inspection tools.

Examination processes are used at various steps during semiconductor fabrication to detect and classify defects on specimens, as well as perform metrology related operations. Effectiveness of examination can be increased by automatization of process(es) as, for example, Automatic Defect Classification (ADC), Automatic Defect Review (ADR), etc.

SUMMARY

In accordance with certain aspects of the presently disclosed subject matter, there is provided a method of generating a training set for training a Deep Neural Network (DNN) usable for examination of a specimen, the method performed by a processor and memory circuitry (PMC), the method comprising: obtaining a group of training images each representative of at least a portion of a specimen; for each given training image in the group: i) generating a first batch of training patches, including: cropping the given training image into a first plurality of original patches according to a plurality of first positions on the given training image; and augmenting at least part of the first plurality of original patches in order to simulate variations caused by a physical process of the specimen, giving rise to a first plurality of augmented patches constituting the first batch of training patches; and ii) generating a second batch of training patches, including: shifting the plurality of first positions to a plurality of second positions on the given training image, thereby obtaining a second plurality of original patches corresponding to the plurality of second positions, and repeating the augmenting to the second plurality of original patches to generate a second plurality of augmented patches thereby giving rise to a second batch of training patches; and including at least the first batch and the second batch of training patches corresponding to each given training image to the training set.

In addition to the above features, the method according to this aspect of the presently disclosed subject matter can comprise one or more of features (i) to (viii) listed below, in any desired combination or permutation which is technically possible:

(i). The training set can be used for training a DNN usable for at least one examination process selected from a group comprising: automated defect detection, automated defect review, automated defect classification, automated segmentation, and automated metrology based on runtime images.

(ii). The method can further comprise repeating the generating of a second batch of training patches one or more times until a completion criterion is met, giving rise to one or more batches of training patches, and including the one or more batches in the training set.

(iii). The method can further comprise including the first plurality of original patches and/or the second plurality of original patches in the training set.

(iv). The predetermined positions can be in accordance with a grid.

(v). The shifting can be performed according to a random direction with a random offset.

(vi). The simulated variations can include process variation and/or gray level variation.

(vii). The method can further comprise including the first batch of training patches corresponding to each training image in a first epoch for training of the DNN, and including the second batch of training patches corresponding to each training image in a second epoch for training of the DNN.

(viii). The training images can be high resolution images obtained from a review tool.

In accordance with other aspects of the presently disclosed subject matter, there is provided a system of generating a training set for training a Deep Neural Network (DNN) usable for examination of a specimen, the system comprising a processor and memory circuitry (PMC) configured for: obtaining a group of training images each representative of at least a portion of a specimen; for each given training image in the group: i) generating a first batch of training patches, including: cropping the given training image into a first plurality of original patches according to a plurality of first positions on the given training image; and augmenting at least part of the first plurality of original patches in order to simulate variations caused by a physical process of the specimen, giving rise to a first plurality of augmented patches constituting the first batch of training patches; and ii) generating a second batch of training patches, including: shifting the plurality of first positions randomly to a plurality of second positions on the given training image thereby obtaining a second plurality of original patches corresponding to the plurality of second positions, and repeating the augmenting to the second plurality of original patches to generate a second plurality of augmented patches thereby giving rise to a second batch of training patches; and including at least the first batch and the second batch of training patches corresponding to each given training image to the training set.

This aspect of the disclosed subject matter can comprise one or more of features (i) to (viii) listed above with respect to the method, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform a method of generating a training set for training a Deep Neural Network (DNN) usable for examination of a specimen, the method comprising: obtaining a group of training images each representative of at least a portion of a specimen; for each given training image in the group: i) generating a first batch of training patches, including: cropping the given training image into a first plurality of original patches according to a plurality of first positions on the given training image; and augmenting at least part of the first plurality of original patches in order to simulate variations caused by a physical process of the specimen, giving rise to a first plurality of augmented patches constituting the first batch of training patches; and ii) generating a second batch of training patches, including: shifting the plurality of first positions to a plurality of second positions on the given training image thereby obtaining a second plurality of original patches corresponding to the plurality of second positions, and repeating the augmenting to the second plurality of original patches to generate a second plurality of augmented patches thereby giving rise to a second batch of training patches; and including at least the first batch and the second batch of training patches corresponding to each given training image to the training set.

This aspect of the disclosed subject matter can comprise one or more of features (i) to (viii) listed above with respect to the method, mutatis mutandis, in any desired combination or permutation which is technically possible.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "generating", "training", "obtaining", "cropping", "augmenting", "shifting", "repeating", "including" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the FPEI (Fabrication Process Examination Information) system and respective parts thereof disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
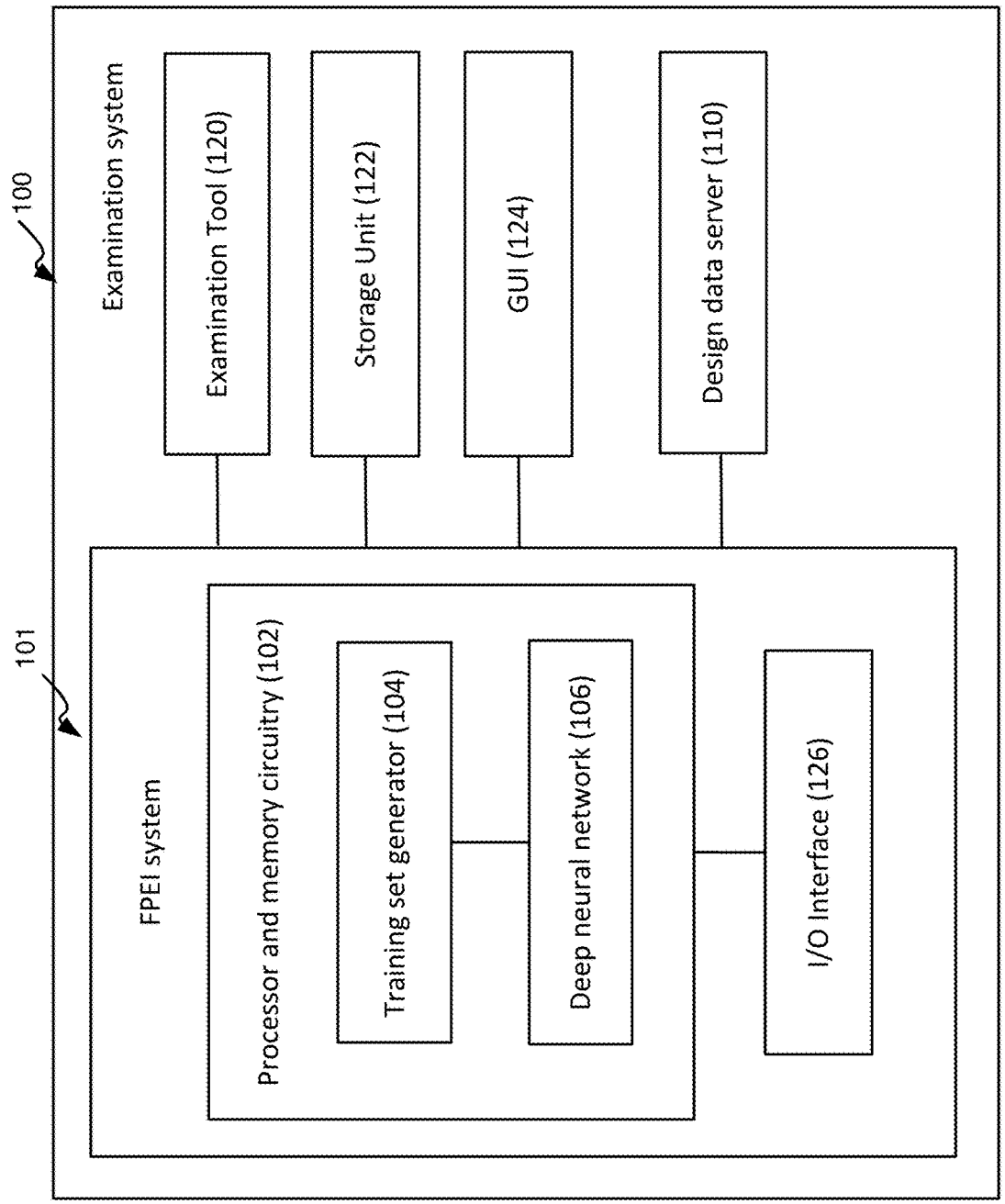
FIG. 1 illustrates a generalized block diagram of an examination system in accordance with certain embodiments of the presently disclosed subject matter.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g. of a wafer and/or parts thereof) as part of the specimen fabrication process. The illustrated examination system 100 comprises a computer-based system 101 capable of automatically determining metrology-related and/or defect-related information using images obtained during specimen fabrication (referred to hereinafter as fabrication process (FP) images). The system 101 is referred to hereinafter as an FPEI (Fabrication Process Examination Information) system. According to certain embodiments of the presently disclosed subject matter, FPEI system 101 can be configured to perform segmentation of an image representative of at least a portion of a specimen, as will be described below in further detail with reference to FIG. 3. System 101 can be operatively connected to one or more examination tools 120. The examination tools are configured to capture FP images and/or to review the captured FP image(s) and/or to enable or provide measurements related to the captured image(s). The FPEI system can be further operatively connected to a design data server 110 and a storage unit 122.

For example, FP images can be selected from images of a specimen (e.g. wafer or parts thereof) captured during the manufacturing process, derivatives of the captured images obtained by various pre-processing stages (e.g. images of a part of a wafer or a photomask captured by SEM or an optical inspection system, SEM images roughly centered around the defect to be classified by ADC, SEM images of larger regions in which the defect is to be localized by ADR, registered images of different examination modalities corresponding to the same mask location, segmented images, height map images, etc.) and computer-generated design data-based images.

The term "examination tool(s)" used herein should be expansively construed to cover any tools that can be used in examination-related processes including, by way of non-limiting example, imaging, scanning (in a single or in multiple scans), sampling, reviewing, measuring, classifying and/or other processes provided with regard to the specimen or parts thereof. The one or more examination tools 120 can include one or more inspection tools and/or one or more review tools. In some cases, at least one of the examination tools 120 can be an inspection tool configured to scan a specimen (e.g., an entire wafer, an entire die or portions thereof) to capture inspection images (typically, at relatively high-speed and/or low-resolution) for detection of potential defects. In some cases, at least one of the examination tools 120 can be a review tool, which is configured to capture review images of at least some of the defects detected by inspection tools for ascertaining whether a potential defect is indeed a defect. Such a review tool is usually configured to inspect fragments of a die, one at a time (typically, at relatively low-speed and/or high-resolution). The inspection tool and review tool can be different tools located at the same or at different locations, or a single tool operated in two different modes. In some cases at least one examination tool can have metrology capabilities.

Without limiting the scope of the disclosure in any way, it should also be noted that the examination tools 120 can be implemented as inspection machines of various types, such as optical imaging machines, electron beam inspection machines, and so on. In some cases the same examination tool can provide low-resolution image data and high-resolution image data.

FPEI system 101 includes a processor and memory circuitry (PMC) 102 operatively connected to a hardware-based I/O interface 126. PMC 102 is configured to provide all processing necessary for operating the FPEI system as further detailed with reference to FIG. 2 and comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC. Functional modules comprised in PMC 102 include a training set generator 104.

According to certain embodiments, the training set generator 104 can be configured to obtain a group of training images, each representative of at least a portion of a specimen, and for each given training image in the group, generate a first batch of training patches and a second batch of training patches, and include at least the first batch and the second batch of training patches corresponding to each given training image in the training set. The first batch can be generated by cropping the given training image into a first plurality of original patches according to a plurality of first positions on the given training image, and augmenting at least some/part of the first plurality of original patches in order to simulate variations caused by a physical process of the specimen, giving rise to a first plurality of augmented patches constituting the first batch of training patches. The second batch can be generated by shifting the plurality of first positions to a plurality of second positions on the given training image, thereby obtaining a second plurality of original patches corresponding to the plurality of second positions, and repeating the augmenting to the second plurality of original patches to generate a second plurality of augmented patches, thereby giving rise to a second batch of training patches. Details of the generation process are described below with reference to FIG. 2.

In certain embodiments, functional modules can further comprise a Deep Neural Network (DNN) 106. DNN 106 can be configured to enable data processing using deep neural network(s) for outputting application-related data based on the fabrication (FP) input data. Optionally, PMC 102 can further comprise a pre-DNN module (not shown separately) configured to provide preprocessing before forwarding input data to the DNN and/or post-DNN module (not shown separately) configured to provide post-processing data generated by the DNN. Operation of FPEI system 101, PMC 102 and the functional modules therein will be further detailed with reference to FIG. 2.

DNN 106 can comprise a supervised or unsupervised DNN model which includes layers organized in accordance with respective DNN architecture. By way of non-limiting example, the layers of DNN can be organized in accordance with Convolutional Neural Network (CNN) architecture, Recurrent Neural Network architecture, Recursive Neural Networks architecture, Generative Adversarial Network (GAN) architecture or otherwise. Optionally, at least some of the layers can be organized into a plurality of DNN sub-networks. Each layer of DNN can include multiple basic computational elements (CE) typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of a deep neural network can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. Optionally, at least part of DNN subnetworks (if any) can be trained separately prior to training the entire DNN.

A set of DNN input data used to adjust the weights/thresholds of a deep neural network is referred to hereinafter as a training set.

It is noted that the teachings of the presently disclosed subject matter are not bound by specific architecture of the DNN 106.

Alternatively or additionally to DNN 106, PMC 102 can comprise one or more examination modules, such as, e.g., segmentation module and/or defect detection module and/or Automatic Defect Review Module (ADR) and/or Automatic Defect Classification Module (ADC) and/or metrology-related module and/or other examination modules which are usable for examination of a semiconductor specimen. Optionally, the one or more examination modules can comprise the DNN 106. Optionally, DNN 106 can be shared between the examination modules or, alternatively, each of the one or more examination modules can comprise its own DNN 106.

According to certain embodiments, system 101 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images and/or derivatives thereof produced by the examination tool 120. Accordingly, the one or more images can be retrieved from the storage unit 122 and provided to the PMC 102 for further processing.

In some embodiments, system 101 can optionally comprise a computer-based Graphical user interface (GUI) 124 which is configured to enable user-specified inputs related to system 101. For instance, the user can be presented with a visual representation of the specimen (for example, by a display forming part of GUI 124), including image data of the specimen. The user may be provided, through the GUI, with options of defining certain operation parameters. The user may also view the operation results on the GUI.

As will be further detailed with reference to FIG. 2, system 101 is configured to receive, via I/O interface 126, FP input data. FP input data can include data (and/or derivatives thereof and/or metadata associated therewith) produced by the examination tools 120 and/or data stored in one or more data depositories. It is noted that FP input data can include image data (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen. In some embodiments of the present disclosure, for training purposes, FP input data can include a group of training images for the purpose of preparing a training set usable for training a DNN. It is noted that image data can be received and processed together with metadata (e.g. pixel size, text description of defect type, parameters of image capturing process, etc.) associated therewith.

FPEI system is further configured to process at least part of the received FP input data and send, via I/O interface 126, the results (or part thereof) to the storage unit 122, and/or the examination tool(s) 120, and/or GUI 124 (for rendering the results) and/or external systems (e.g. Yield Management System (YMS) of a FAB).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in another embodiments at least some of examination tools 120, storage unit 122 and/or GUI 124 can be external to the examination system 100 and operate in data communication with system 101 via I/O interface 126. System 101 can be implemented as stand-alone computer(s) to be used in conjunction with the examination tools. Alternatively, the respective functions of the system 101 can, at least partly, be integrated with one or more examination tools 120, thereby facilitating and enhancing the functionalities of the examination tools 120 in examination related processes.

For purpose of illustration only, the following description is provided for generating a training set for training a DNN usable for examination of a semiconductor specimen. Those skilled in the art will readily appreciate that the teachings of the presently disclosed subject matter are applicable to various types of machine learning models, such as, e.g., support vector machine (SVM), etc., and to various examinations such as, for example, segmentation, defect detection, ADR, ADC, an automated navigation module, an automated segmentation module, metrology-related module, and alike.

Figure 2:
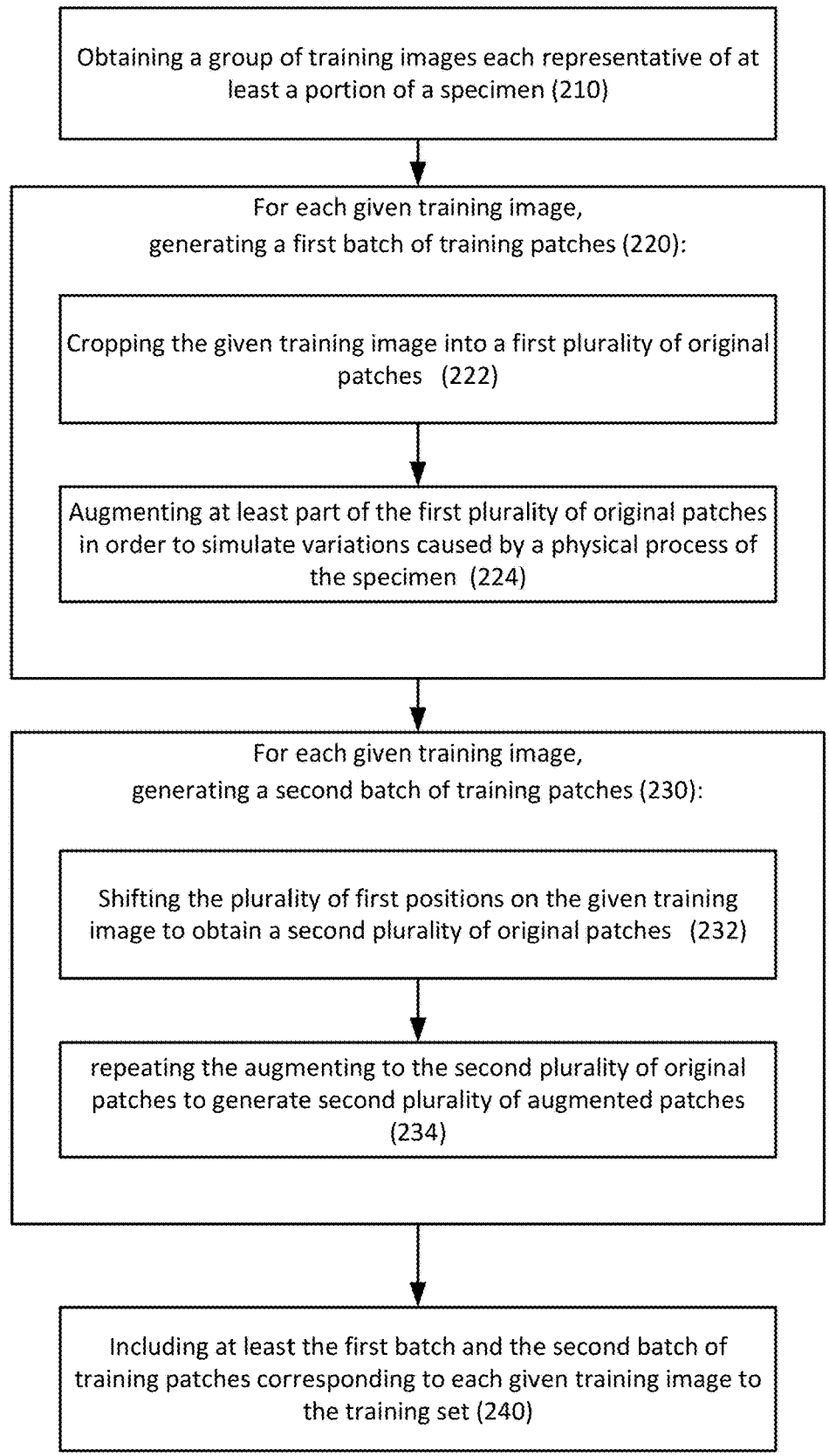
FIG. 2 illustrates a generalized flowchart of generating a training set for training a DNN usable for examination of a semiconductor specimen in accordance with certain embodiments of the presently disclosed subject matter.

Referring to FIG. 2, there is illustrated a generalized flowchart of generating a training set for training a DNN usable for examination of a semiconductor specimen in accordance with certain embodiments of the presently disclosed subject matter.

A group of training images, each representative of at least a portion of a specimen, can be obtained (210) (e.g., by the training set generator 104 via I/O interface 126).

Depending on the application, a training image can be a "real world" image of a specimen obtained in a fabrication process thereof. By way of non-limiting example, the image can be obtained by examining a specimen using one or more low-resolution examination machines (e.g. an optical inspection system, low-resolution SEM, etc.). Alternatively or additionally, the image can be obtained by examining the specimen using a high-resolution machine (e.g. a subset of potential defect locations selected for review can be reviewed by a scanning electron microscope (SEM) or Atomic Force Microscopy (AFM) etc.).

In some embodiments, ground truth data associated with the training image can also be obtained. By way of example, ground truth data can include images and/or labels indicative of application-specific information, such as, e.g., defect size, orientation, background segments, etc. Ground truth data can be synthetically produced (e.g. CAD-based images), actually produced (e.g. captured images), produced by machine-learning annotation (e.g. labels based on feature extracting and analysis), produced by human annotation, or a combination of the above, etc. In one embodiment, the training set as generated in accordance with the presently disclosed subject matter can be used for training a DNN usable for segmentation of FP images, and the ground truth data associated therewith are labels indicative of segments on the training images. For instance, the segments can be representative of structural elements as presented in the FP images.

It is recognized that for training a deep neural network, a large training database is generally needed for sufficient training of the DNN. However, in the cases of training a DNN usable for examination of a semiconductor specimen, it is a known challenge to obtain sufficient training data, since available training images are very limited and are sometimes hard to obtain. In particular, in supervised learning, it is very difficult to acquire a sufficient amount of fully annotated image data as required. Therefore, according to certain embodiments of the present disclosed subject matter, there is proposed a method of generating a training set based on a limited amount of image data.

Specifically, for each given training image in the group, a plurality of batches of image patches can be generated. By way of example, a first batch of training patches can be generated (220) (e.g., by the training set generator 104), including: cropping (222) the given training image into a first plurality of original patches according to a plurality of first positions on the training image; and augmenting (224) the first plurality of original patches in order to simulate one or more variations caused by a physical process of the specimen, giving rise to a first plurality of augmented patches. The first plurality of augmented patches constitute the first batch of training patches. According to certain embodiments, the physical process can refer to the fabrication process and/or the examination process of the specimen.

In some embodiments, for generating the first batch of training patches, the plurality of first positions can be a plurality of predetermined positions defined according to a grid, and the given training image can be cropped into a first plurality of original patches according to the predetermined first positions. By way of example, anchor points in the grid (e.g., the intersection points within the grid) can serve as the predetermined first positions and the patches can be generated as centering around these anchor points, with a predefined size/dimension and a step size (i.e., an amount of overlap between neighboring patches). For instance, a training image can be in the dimension of 1000*1000 pixels, and the training patches can be cropped in the size of 100*100, 150*150 or 200*200 pixels, etc., with a step size of a half-patch overlap between the neighboring patches.

In some embodiments, the plurality of first positions can be obtained by shifting a plurality of predetermined positions, such as the positions of the anchor points. By way of example, the shifting can be performed randomly for each predetermined position in accordance with a probability function. For example, for the first anchor point in the grid, it may be determined, according to the probability function, to shift it (e.g., to a random direction with a random offset), whereas for the second anchor point it may be determined, according to the probability function, not to shift it at all. The anchor points which are determined to be shifted can be shifted randomly (e.g., each anchor point shifts to a random direction with a random offset) around the intersection points in the grid, and the shifted positions are used as the first positions for cropping the image patches. By way of another example, the shifting can be performed according to a predefined list defining how to shift each predetermined position respectively. By shifting the positions of the patches, diversity of the coverage of the generated patches can be increased. The term probability function used herein can refer to a probability distribution function that gives the probabilities of occurrence of different possible outcomes of an event. By way of example, the probability function can be a uniform probability distribution function.

The original patches can then be augmented for the purpose of simulating possible variations caused by a physical process of the specimen. This is because the amount of training images is limited, thus not all of the common physical phenomena of the fabrication process and/or the examination process can be encountered during training. By performing augmentation on the patches and including the augmented patches in the training set, the diversity of the training set can be greatly increased and the robustness of the training to these variations can be enhanced.

Generally speaking, augmentation of an image can be provided by various image processing techniques including: adding noise, blurring, geometric transformation (e.g. rotating, stretching, simulating different angles, cropping, scaling, etc.) tone mapping, changing vector information of one or more pixels of the image (e.g. adding and/or modifying perspectives or channels of acquisition, etc.), etc.

In some embodiments, augmentation techniques can be applied to the training images in an application-independent manner. By way of example, for segmentation related applications, and/or defect detection related applications, and/or classification related applications, the simulated variations can include gray level variation and/or process variation (PV), etc., and one or more of the following augmentation processes can be applied for simulating effects of such variations.

According to certain embodiments, gray level variations can be caused by physical effects of the examination process of the specimen. By way of example, gray levels of images, taken by different examination tools, can differ by a factor, even when captured at the same location of the same wafer with the same resolution. This can be caused by, e.g., different physical configurations and calibrations of the examination tools/detectors etc. Additionally, gray level of images taken from different locations of the wafer can also vary. Thus, training a DNN based on the images captured by a tool other than a tool that captures FP images, and/or based on images captured for different locations of a wafer, can deteriorate generalization capabilities of the DNN.

Therefore, gray level intensities in the image patches can be adjusted for simulating such effect. By way of example, for each image patch, a pixel value histogram of the image patch can be generated, and a gray level bias number can be randomly selected within a bias range and can be applied to the histogram. For instance, the bias range can be determined as a predefined percentage of the pixel value range (or part thereof) in the image, and the selection of the bias number to be applied for each image patch can be in accordance with a uniform distribution within the range. The training set comprising such augmented images will enable increased robustness to tool variations and reduce the necessity of collecting training data from multiple tools.

By way of another example, the gray level intensities of an image patch can also be adjusted by changing the contrast of the image patch. For instance, the pixel value histogram of the image patch can be stretched for getting a better contrast.

According to further embodiments, gray level variations can include Color variation (CV). Color variation can occur within a single image (e.g. due to layer thickness variations) or between defect and reference image. CV can stem from different tool calibration and can be characterized by a local change of GL in the image. For addressing such an effect, the original image patch can be augmented to have different desired levels of added variations. Thus, the training set comprising such augmented images will enable increased robustness to the color variations in the FP images.

According to certain embodiments, pattern variations may appear in different images which may be caused by effects of Process variation (PV). Process variation can refer to variations caused by a change in the fabrication process of the specimen. By way of example, the fabrication process may cause slight shifting/scaling/distortion of certain structures/patterns between different inspection images which results in pattern variation in the images. By way of another example, the fabrication process may cause thickness variation of the specimen, which affects reflectivity, thus in turn affecting gray level of the resulting inspection image. For instance, die-to-die material thickness variation can result in a different reflectivity between two of the dies, which leads to a different background gray level value for the images of the two dies.

For addressing such an effect, in some cases, augmentation techniques such as, e.g., scaling, flipping, etc., can be applied on the image patch or at least part thereof for adjusting pattern variations.

In some cases, other possible effects of a physical process can include, but not limited to: noise (e.g., each gray level intensity contains a different scale of noise intensity), focusing errors (e.g., some patterns are more sensitive to focusing errors than others), charging effects (which may create artificial differences between FP and reference images and can substantially affect examination processes), calibration of quad detectors (which may be suboptimal, resulting in images with overlap within different perspectives) etc.

Figure 6:
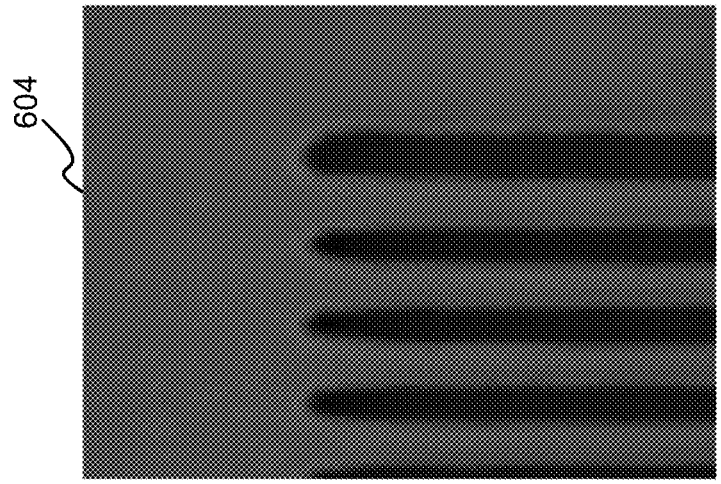
FIG. 6 illustrates an example of a pair of original patch and augmented patch in accordance with certain embodiments of the presently disclosed subject matter.
Figure 6:
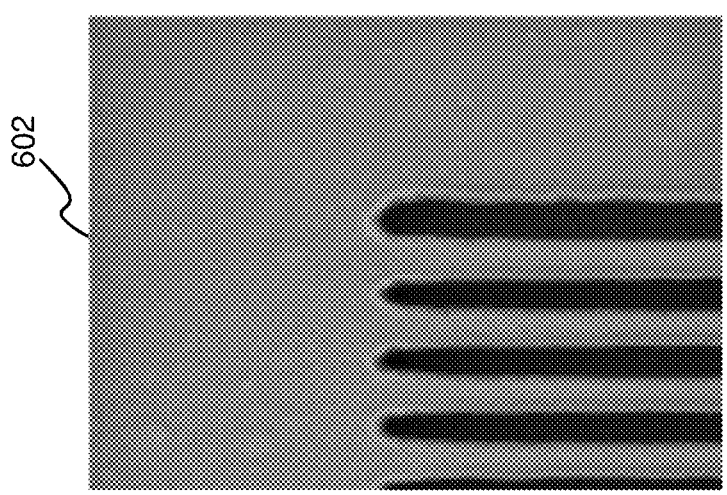

Turning now to FIG. 6, there is illustrated an example of a pair of original patch and augmented patch in accordance with certain embodiments of the presently disclosed subject matter. As shown, the original patch 602 went through one or more of the augmentation processes as described above for addressing variances caused by e.g., PV, gray level variance and/or CV, etc., and a corresponding augmented patch 604 is generated. By way of example, the augmented patch 604 in the current example was synthesized to simulate effects caused by PV, scaling and gray level variation. For instance, it can be seen that the contour of the polygons, the size of the polygons and the overall gray level intensities in augmented patch 604 were adjusted as compared to the original patch 602.

In accordance with certain embodiments of the presently disclosed subject matter, at least some/part of the first plurality of original patches can be augmented. By way of example, it can be randomly determined for each original patch in the first plurality of original patches, whether or not to augment the original patch, e.g., according to a probability function. Thus by using the probability function, at least part of the patches will be determined to be augmented. For each image patch of the at least part of the first plurality of original patches, one or more of the above described interfering variations/effects can be simulated by using corresponding image augmentation techniques. In some cases, the at least part of the first plurality of original patches are augmented with respective augmentation intensities determined in accordance with a probability function. By way of another example, the decision of whether or not to augment each patch, and/or the specific augmentation techniques to apply and/or the specific augmentation intensities to apply, can be determined in accordance with respective predetermined lists. For instance, a predetermined decision list can include which original patches to augment, and a augmentation list can include which augmentation techniques and/or the specific intensities to apply for each patch.

Among advantages of certain embodiments of the augmentation processes (including the illustrated above) is reducing the impact of interfering effects on the trained DNN and, thus, improving robustness and effectiveness of implementing the trained DNN for different applications, such as, e.g., segmentation, ADC, ADR, matching, metrology and other examination tasks.

As aforementioned, augmentation techniques can be applied to the training images in an application-independent manner. By way of example, for defect detection related application, augmentation techniques such as, e.g., adding noise, blurring, tone mapping, implanting synthetic defects, modification of defect tones, etc., can be applied instead of or in addition to the above described techniques. For classification related application, augmentation techniques such as, e.g., geometric transformation, tone mapping, implanting synthetic defects, modification of defect tones, etc., can be applied instead of or in addition to the above described techniques.

Alternatively or additionally, an image can be augmented using synthetic data (e.g. defect-related data, simulated connectors or other objects, implants from other images, etc.). By way of non-limiting example, available images (and/or parameters) of known defect types can be used to plant a new defect in an image, amplify the defectiveness of a pre-existing defect in the image, remove a defect from the image, disguise a defect in the image (making it harder to detect), etc.

Yet alternatively or additionally, an image can be augmented using segmentation, defect contour extraction and/or height map calculation, and/or can be obtained by processing together with a corresponding CAD-based image.

After the first batch of training patches are generated, as described above with reference to block 220, a second batch of training patches can be generated (230) (e.g., by the training set generator 104) for each given training image in the group, including shifting (232) the plurality of first positions to a plurality of second positions on the given training image, thereby obtaining a second plurality of original patches corresponding to the plurality of second positions, and repeating (234) the augmentation on the second plurality of original patches to generate a second plurality of augmented patches, thereby giving rise to a second batch of training patches. Once the first and second batches of training patches are generated for each training image in the group, both batches for all the training images can be included in a training set to be used for training a DNN.

According to certain embodiments, the shifting and augmentation described above can be repeated one or more times so as to generate one or more additional batches of training patches. The additional batches can also be included in the training set. In some cases, the first and second plurality of original patches can also be included in the training set.

Figure 5:
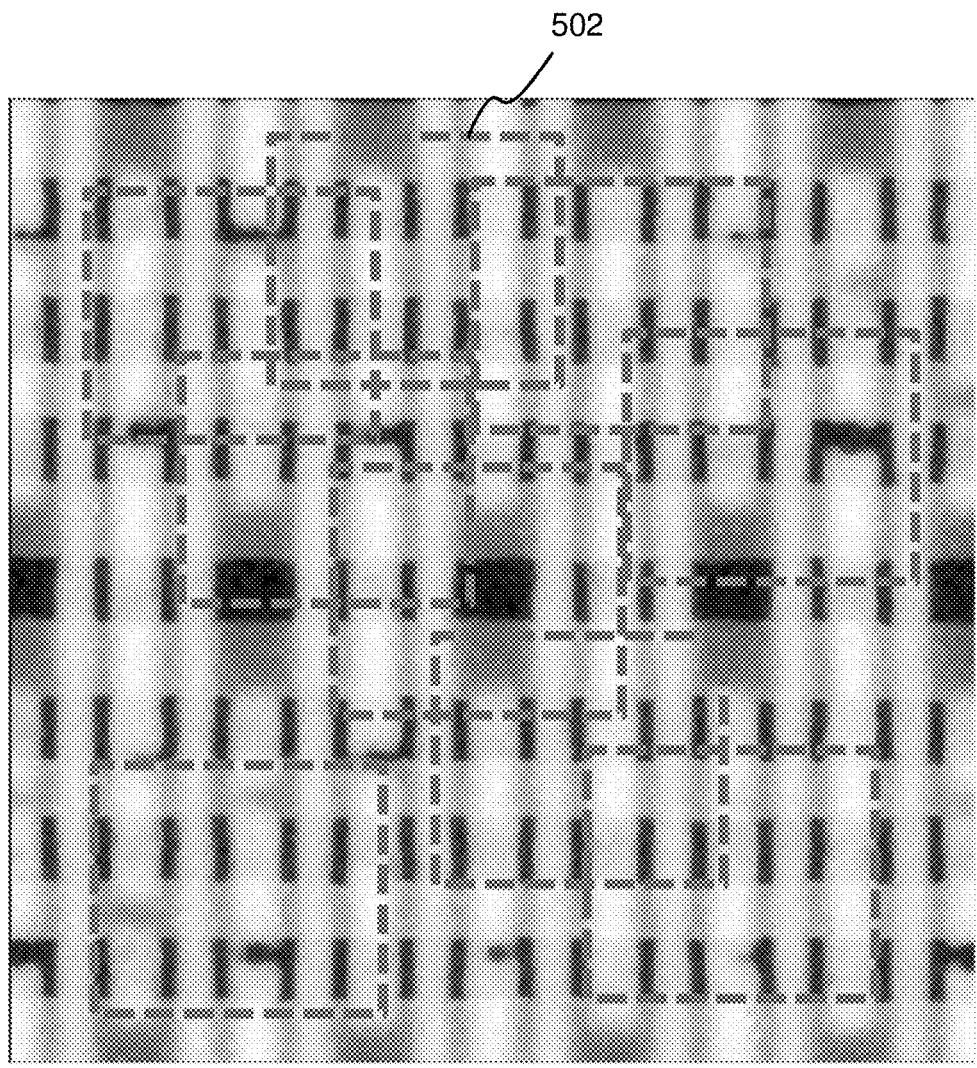
FIG. 5 illustrates an example of a second plurality of original patches obtained after shifting of the initial positions in accordance with certain embodiments of the presently disclosed subject matter.

In some embodiments, the shifting can be performed respectively for each first position, in a similar manner as described above with reference to generating the first batch of patches. Each first position can be randomly determined whether or not to be shifted in accordance with a probability function. By way of example, each of the initial positions (or at least some thereof) can be shifted in a random direction with a random offset in order to get a second plurality of positions on the image. The image can be cropped according to the second plurality of positions to obtain the second plurality of original patches. Turning now to FIG. 5, there is illustrated an example of a second plurality of original patches obtained after shifting of the initial positions in accordance with certain embodiments of the presently disclosed subject matter. As shown, the patches can be cropped according to different positions 502 as marked by dashed squares in the figure. These positions are obtained after random shift from corresponding initial positions. Assuming the initial positions are determined in accordance with a predefined grid, as can be seen, each current position 502 is with a respective randomization from a corresponding initial position (e.g., shifted in different directions with different offsets). In some cases, it is possible that some of the positions are not shifted at all, e.g., when the offset is determined to be zero.

In some embodiments, generating a training set can further include obtaining augmented ground truth data with regard to the augmented training patches and associating the augmented training patches and the augmented ground truth data. The generated training set, including the batches of augmented training patches associated with augmented ground truth data, can be stored in the memory of PMC 102. The generated augmented images can be added to the training set in association with the ground truth data. In some cases original and augmented images can be associated with the same ground truth data. Alternatively, augmented images can be associated with augmented ground truth data (e.g. augmented class distribution in the training set).

Likewise, for ground truth data associated with the original training images and training patches, augmented ground truth data can be provided by a person analyzing the augmented image patches, with or without the aid of a computer system. Alternatively or additionally, augmented ground truth data can be generated by a FPEI system by processing the original ground truth data corresponding to the augmentation provided in respective original patches when deriving the augmented training patches.

In accordance with certain embodiments of the presently disclosed subject matter, the number of training image patches in the generated training set can be substantially larger than the number of "real world" training samples. For example, the group of training images can include between tens of training samples, while the training set generated in accordance with certain embodiments of the presently disclosed subject matter can include at least thousands of training samples. It is noted that capturing images and annotation thereof is a slow—and possibly also costly—process. Generating a sufficient amount of training samples in the training set, by cropping the images and augmenting the image patches, enables efficiency of DNN training.

Furthermore, techniques of augmentation and synthetic image generation enable tailoring the generated training set to the requirements of a specific application. By way of non-limiting example, lack of FAB data related to a specific class of defects (e.g. minority class) can be compensated by synthetic and/or augmented images presenting the respective defects. By way of a further non-limiting example, lack of appropriate FAB data related to a specific layer can be compensated by synthetic images related to this layer. Likewise, lack of data from a specific tool necessary for tool variation training, can be compensated by synthetic images related to this tool.

Figure 3:
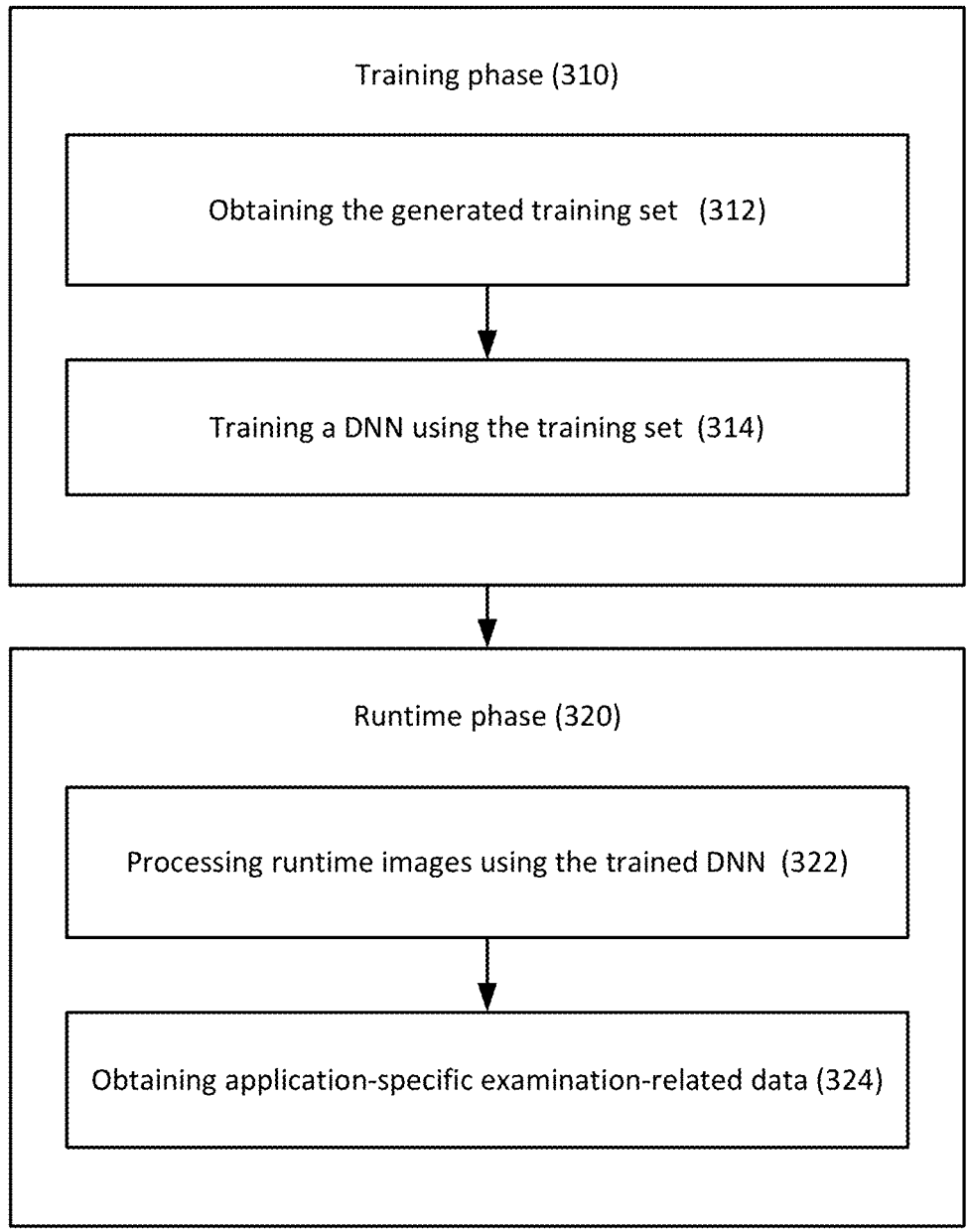
FIG. 3 illustrates a generalized flowchart of using the generated training set for training a DNN in accordance with certain embodiments of the presently disclosed subject matter.

Turning now to FIG. 3, there is illustrated a generalized flowchart of using the generated training set for training a DNN in accordance with certain embodiments of the presently disclosed subject matter.

In the training phase 310, upon obtaining (312) the training set as generated in accordance with the process described in FIG. 2, FPEI system 101 can use DNN 106 to iteratively process the training set and to provide application-specific set of training-based parameters (e.g., weights in the DNN, etc.) thereby obtaining an application-specific trained DNN (314). The training-based parameters correspond to application-specific cost functions. By way of example, for segmentation related application, the cost function can relate to segmentation accuracy (e.g., correct segmentation label map vs. predicted label map). By way of another example, for defect detection related application, the cost function can relate to detection accuracy and penalty for misdetection and over-detection. By way of further example, for classification related application, the cost function can relates to classification error. Optionally, processing the training set using DNN can include pre-process operations by pre-DNN module (e.g. selecting input channels, resizing/cropping, etc.) and post-process operations by post-DNN module (e.g. executing spatial pyramid pooling, multi-scale pooling, Fisher Vectors, etc.). In addition to application-specific optimized weights, training-based parameters can further include optimized application-specific thresholds, application-specific pre-processing parameters and application-specific post-processing parameters.

It is noted that in some embodiments the illustrated training process can be cyclic, and can be repeated several times until the DNN is sufficiently trained. By way of example, the training process can start from using the first batch of training patches. For instance, the first batch of training patches for each training image, as generated in accordance the process described in block 220, can be used for performing the first epoch of training (e.g., a complete pass through the training set). A user can provide feedback for the results reached by the DNN based on the initial training set (e.g., the first batch of training patches). The provided feedback can include, for example: changes of sensitivity, updates of ground-truth segmentation and/or manually defining regions of interest (ROIs) for segmentation applications, manual re-classification of one or more pixels, regions and/or defects for classification applications, re-defining mask/bounding box for defect detection applications, etc.

The PMC can adjust the next training cycle based on the received feedback. Adjusting can include at least one of: updating the training set (e.g. updating ground truth data and/or augmentation algorithms, obtaining additional augmented training samples, etc.), updating cost function, updating pre-DNN and/or post/DNN algorithms, etc. The next training cycle (i.e., the second epoch) can start by using the second batch of training patches corresponding to each training image, as generated in accordance the process described in block 230.

Once the training phase is completed, the trained DNN can be used in runtime 320 for specific applications. The PMC 102 can use the trained DNN to process (322) together one or more runtime FP images and, to obtain (324), thereby, application-specific examination-related data. The one or more FP images can be obtained by the same or by different examination modalities. It is noted that training data shall correspond to the FP images to be used for the respective application.

By way of non-limiting example, application-specific examination-related data can represent a per-pixel map of values whose meaning depends on an application (e.g. binary map for defect detection; label map for segmentation; discrete map for nuisance family prediction indicating the family type or general class; discrete map for defect type classification; continuous values for cross modality or die-to model (D2M) regression, etc.). A per-pixel map can be further obtained together with a per-pixel probability map indicative of probability of values obtained for the pixels.

Alternatively or additionally, application-specific examination-related data can represent one or more values summarizing entire image content of a larger region (not per-pixel), such as, for example, defect attributes, segmentation labels for certain structural elements and/or layers, defect bounding box candidates and associated defectiveness probabilities for automatic defect review application, defect class and class probability for automatic defect classification application, etc. Alternatively or additionally, examination-related data can be usable for metrology purposes. For instance, a segmentation map can be used for performing measurements on the images of the specimen.

Figure 4:
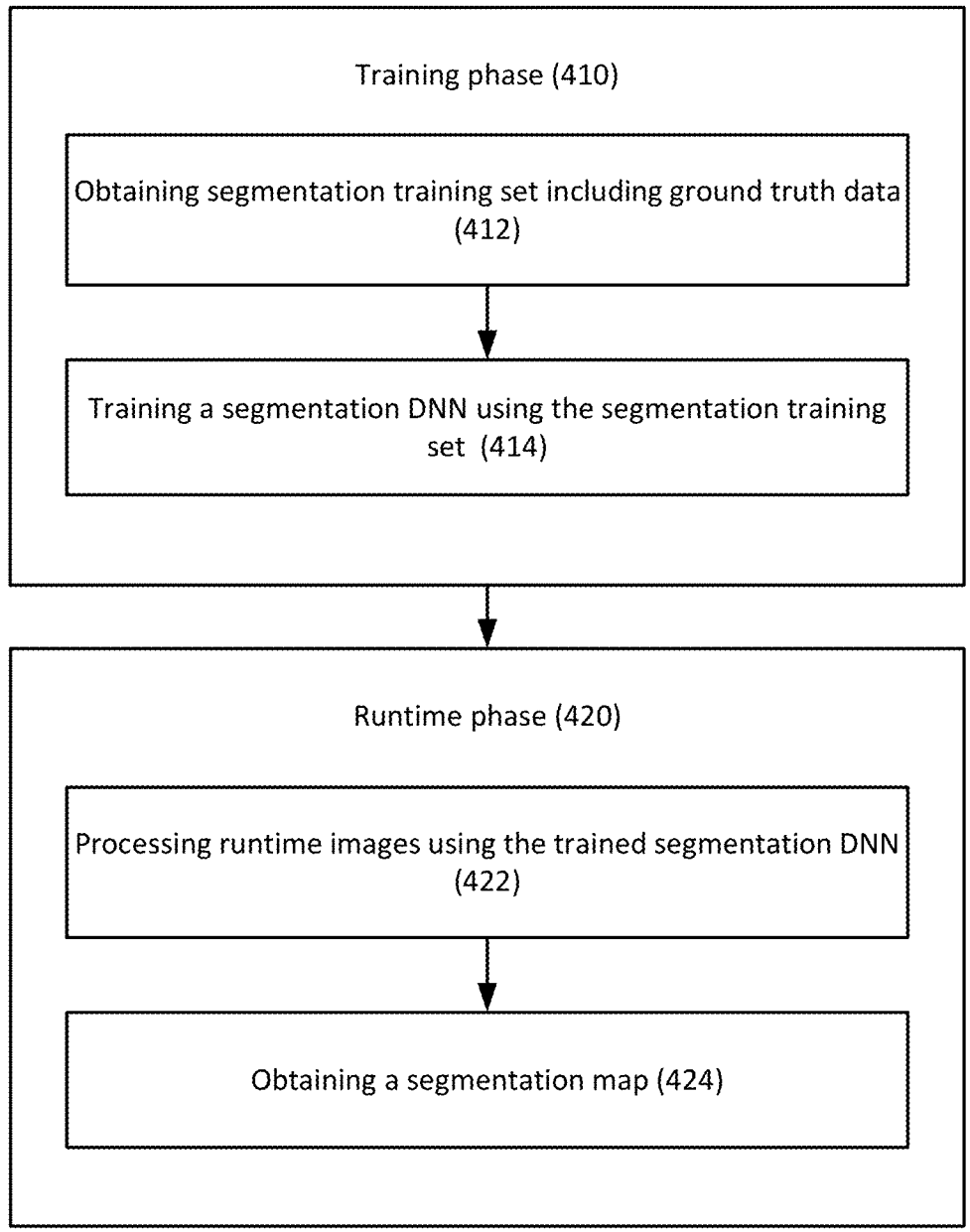
FIG. 4 illustrates an example of implementing the technique detailed above with reference to FIG. 3 for segmentation of an FP image in accordance with certain embodiments of the presently disclosed subject matter.

Referring to FIG. 4, there is illustrated an example of implementing the technique detailed above with reference to FIG. 3 for segmentation of an FP image in accordance with certain embodiments of the presently disclosed subject matter. Unless specifically stated otherwise, the term "segmentation" used in this specification should be expansively construed to cover any process of partitioning an image into meaningful parts/segments (for example, background and foreground, noisy and non-noisy areas, structural elements, defect and non-defect, etc.) whilst providing per-pixel or per-region values indicative of such segments. By way of example, such segmentation can be used by metrology tools for performing measurements on the specimen. By way of another example, it can also be usable for ADC when constructing attributes (e.g. for defining if the defect is on the main pattern, on the background, or both), for ADR for applying segment-specific detection thresholds on each segment, etc.

The process comprises a setup phase 410 of segmentation-specific training of DNN and runtime phase 420 of using the trained DNN for image segmentation.

During the setup 410, upon obtaining a group of training images and ground truth data, PMC 102 can generate (412) a segmentation training set using the technique as described above with reference to FIG. 2 and uses the generated segmentation training set to obtain (414) a trained segmentation DNN characterized by segmentation-related training parameters.

The group of training images can include previously-captured low-resolution images and/or high-resolution images and, optionally, CAD-based images. By way of example, the training images can be high-resolution review images obtained from a review tool (e.g., SEM). The obtained ground truth data is informative of segments-related data associated with respective training images. By way of non-limiting example, the segments-related data associated with a given training image can be informative of per-pixel or per-region segmentation labels, CAD polygons, ROIs, etc. Once the training set is generated, the augmented training patches in the training set can be associated with augmented ground truth data which is informative of segments-related information with regard to respective augmented training patches.

Upon generating (412) the segmentation training set, PMC trains (414) the DNN using the training set. The training process yields the trained DNN with segmentation-related training parameters.

During runtime 420, PMC uses the trained segmentation DNN to process (422) one or more runtime images comprising one or more captured FP images to be segmented in order to provide (424) a segmentation map for each image. The obtained segmentation map can be informative of per-pixel or per-region segmentation labels indicative of different segments on the image. By way of example, the polygons on one layer can have one segmentation label, and the polygons on another layer can have a different segmentation label, while the background can have a separate segmentation label.

Figure 7:
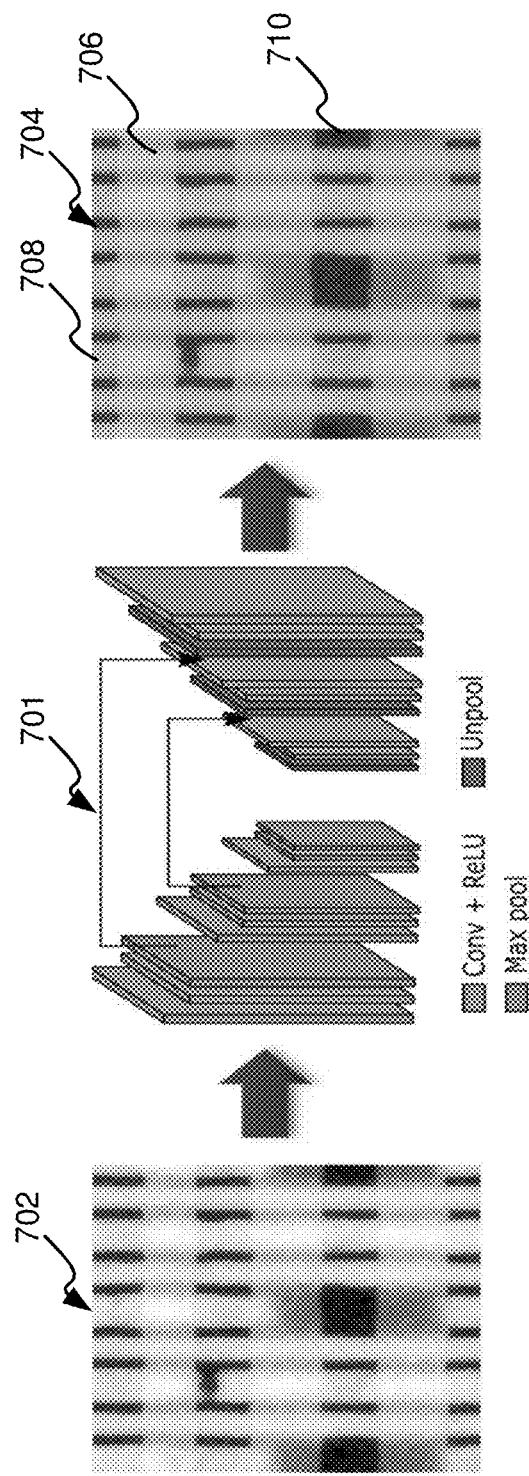
FIG. 7 illustrates an example of an FP image and a corresponding segmentation map generated in accordance with certain embodiments of the presently disclosed subject matter.

Turning now to FIG. 7, there is illustrated an example of a FP image and a corresponding segmentation map generated in accordance with certain embodiments of the presently disclosed subject matter. As shown, an FP image 702 is processed by the trained segmentation DNN 701, and the output of the DNN is a segmentation map 704 in which different colors represent different segments. By way of example, there are illustrated three segments: the horizontal elements 706, the vertical elements 708 and the background 710.

According to certain embodiments of the presently disclosed subject matter, the segmentation DNN is designed with a specific architecture for the purpose of improving performance of the segmentation. By way of example, the DNN can apply a U-Net network architecture which is a convolutional network for fast and precise segmentation of images. The architecture of U-Net is modified and extended to work with fewer training images and to yield more precise segmentations.

In some embodiments, for overcoming the problem of vanishing gradients while maintaining high resolution information during training, the segmentation DNN can apply U-Net based architecture for solving such a problem. The vanishing gradient problem is a known challenge found in training neural networks with gradient-based learning methods and backpropagation. In such methods, each of the neural network's weights receives an update proportional to the partial derivative of the error function with respect to the current weight in each iteration of training. The problem is that in some cases, the gradient will become small (i.e., vanishing), effectively preventing the weight from changing its value. In the worst case, this may completely stop the neural network from further training. The U-Net based network is designed to have better gradient flow and can thus effectively solve the problem.

In some embodiments, during training of the segmentation DNN, in addition to the main loss function (e.g., cross entropy loss) which is calculated as a difference between the actual output produced by the DNN and the ground truth data associated with the respective training data, the segmentation DNN can include one or more additional loss functions dedicated to improving sensitivity of the segmentation. The one or more additional loss functions can be indicative of physical knowledge of the specimen and the image thereof. According to certain embodiments, the one or more additional loss functions can be added to improve smoothness and consistency of the segmentation.

It is to be understood that the present disclosure is not limited in its application to the details set forth in the description contained herein or illustrated in the drawings.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized method for generating a training set for training a Deep Neural Network (DNN) usable for examination of a specimen, the method performed by a processor and memory circuitry (PMC), the method comprising:
obtaining a group of training images, each representative of at least a portion of a specimen;
for each given training image in the group:
i) generating a first batch of training patches, including:
cropping the given training image into a first plurality of original patches according to a plurality of first positions on the given training image; and
augmenting at least part of the first plurality of original patches in order to simulate variations caused by a physical process of the specimen, giving rise to a first plurality of augmented patches constituting the first batch of training patches; and
ii) generating a second batch of training patches, including:
shifting the plurality of first positions to a plurality of second positions on the given training image, thereby obtaining a second plurality of original patches corresponding to the plurality of second positions, and
repeating the augmenting to the second plurality of original patches to generate a second plurality of augmented patches thereby giving rise to a second batch of training patches; and
including at least the first batch and the second batch of training patches corresponding to each given training image in the training set.

2. The computerized method according to claim 1, wherein the training set is used for training the DNN usable for at least one examination process selected from a group comprising: automated defect detection, automated defect review, automated defect classification, automated segmentation, and automated metrology based on runtime images.

3. The computerized method according to claim 1, further comprising repeating the generating of a second batch of training patches one or more times until a completion criterion is met, giving rise to one or more batches of training patches, and including the one or more batches in the training set.

4. The computerized method according to claim 1, further comprising including the first plurality of original patches and/or the second plurality of original patches in the training set.

5. The computerized method according to claim 1, wherein the first positions are predetermined in accordance with a grid.

6. The computerized method according to claim 1, wherein the first positions are obtained by randomly shifting a plurality of predetermined positions.

7. The computerized method according to claim 1, wherein the shifting is performed according to a random direction with a random offset.

8. The computerized method according to claim 1, wherein the simulated variations are selected from a group comprising: process variation and gray level variation.

9. The computerized method according to claim 1, wherein the augmenting at least part of the first plurality of original patches further comprises determining whether or not to augment each original patch in the first plurality of original patches according to a probability function, thereby obtaining the at least part of the first plurality of original patches having a positive determination.

10. The computerized method according to claim 1, wherein the at least part of the first plurality of original patches are augmented with respective augmentation intensities determined based on a probability function.

11. The computerized method according to claim 1, further comprising including the first batch of training patches corresponding to each training image in a first epoch for training of the DNN, and including the second batch of training patches corresponding to each training image in a second epoch for training of the DNN.

12. A computerized system of generating a training set for training a Deep Neural Network (DNN) usable for examination of a specimen, the system comprising a processor and memory circuitry (PMC) configured to perform operations comprising:

obtaining a group of training images each representative of at least a portion of a specimen;

for each given training image in the group:

i) generating a first batch of training patches, including:
cropping the given training image into a first plurality of original patches according to a plurality of first positions on the given training image; and
augmenting at least part of the first plurality of original patches in order to simulate variations caused by a physical process of the specimen, giving rise to a first plurality of augmented patches constituting the first batch of training patches; and ii) generating a second batch of training patches, including:
shifting the plurality of first positions to a plurality of second positions on the given training image, thereby obtaining a second plurality of original patches corresponding to the plurality of second positions, and
repeating the augmenting to the second plurality of original patches to generate a second plurality of augmented patches, thereby giving rise to a second batch of training patches; and including at least the first batch and the second batch of training patches corresponding to each given training image in the training set.

13. The computerized system according to claim 12, wherein the training set is used for training the DNN usable for at least one examination process selected from a group comprising: automated defect detection, automated defect review, automated defect classification, automated segmentation, and automated metrology based on runtime images.

14. The computerized system according to claim 12, wherein the PMC is configured to perform further operations comprising repeating the generating of a second batch of training patches one or more times until a completion criterion is met, giving rise to one or more batches of training patches, and including the one or more batches in the training set.

15. The computerized system according to claim 12, wherein the first positions are obtained by randomly shifting a plurality of predetermined positions.

16. The computerized system according to claim 12, wherein the shifting is performed according to a random direction with a random offset.

17. The computerized system according to claim 12, wherein the simulated variations are selected from a group comprising: process variation and gray level variation.

18. The computerized system according to claim 12, wherein the PMC is further configured to augment at least part of the first plurality of original patches by determining whether or not to augment each original patch in the first plurality of original patches according to a probability function, thereby obtaining the at least part of the first plurality of original patches having a positive determination.

19. The computerized system according to claim 12, wherein the at least part of the first plurality of original patches are augmented with respective augmentation intensities determined based on a probability function.

20. A non-transitory computer readable storage medium tangibly embodying a program of instructions that, when executed by a computer, cause the computer to perform a method of generating a training set for training a Deep Neural Network (DNN) usable for examination of a specimen, the method comprising:

obtaining a group of training images each representative of at least a portion of a specimen;

for each given training image in the group:

i) generating a first batch of training patches, including:
cropping the given training image into a first plurality of original patches according to a plurality of positions on the given training image; and
augmenting at least part of the first plurality of original patches in order to simulate variations caused by a physical process of the specimen, giving rise to a first plurality of augmented patches constituting the first batch of training patches; and ii) generating a second batch of training patches, including:
shifting the plurality of first positions to a plurality of second positions on the given training image, thereby obtaining a second plurality of original patches, and
repeating the augmenting to the second plurality of original patches to generate a second plurality of augmented patches thereby giving rise to a second batch of training patches; and including at least the first batch and the second batch of training patches corresponding to each given training image in the training set.

* * * * *